United States Patent
Al Dibs et al.

(10) Patent No.: US 9,414,012 B2
(45) Date of Patent: Aug. 9, 2016

(54) DEVICE FOR PROJECTING AN IMAGE, PORTABLE MOBILE DEVICE COMPRISING A CORRESPONDING DEVICE, AND A METHOD FOR PROJECTING AN IMAGE

(71) Applicant: ROBERT BOSCH GMBH, Stuttgart (DE)

(72) Inventors: Mohamad Iyad Al Dibs, Pliezhausen (DE); Frank Fischer, Gomaringen (DE); David Slogsnat, Tuebingen (DE); Oliver Krayl, Gerlingen (DE); Daniel Kreye, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/376,338

(22) PCT Filed: Feb. 1, 2013

(86) PCT No.: PCT/EP2013/052073
§ 371 (c)(1),
(2) Date: Aug. 1, 2014

(87) PCT Pub. No.: WO2013/113895
PCT Pub. Date: Aug. 8, 2013

(65) Prior Publication Data
US 2015/0163451 A1  Jun. 11, 2015

(30) Foreign Application Priority Data
Feb. 2, 2012 (DE) .......... 10 2012 201 481

(51) Int. Cl.
| | |
|---|---|
| G03B 21/28 | (2006.01) |
| H04N 7/01 | (2006.01) |
| H04N 9/31 | (2006.01) |
| H04N 5/74 | (2006.01) |
| G02B 26/08 | (2006.01) |

(52) U.S. Cl.
CPC ........... *H04N 7/0127* (2013.01); *H04N 5/7458* (2013.01); *H04N 9/3135* (2013.01); *G02B 26/0833* (2013.01); *H04N 2005/7466* (2013.01)

(58) Field of Classification Search
CPC ........... G02B 27/18; H04N 7/01; H04N 9/31; H04N 5/74
See application file for complete search history.

(56) References Cited

U.S. PATENT DOCUMENTS

| | | | |
|---|---|---|---|
| 6,002,452 A | 12/1999 | Morgan | |
| 2002/0020810 A1* | 2/2002 | Wine | G02B 26/0833 250/234 |

(Continued)

FOREIGN PATENT DOCUMENTS

| | | |
|---|---|---|
| JP | 101 551 60 | 6/1998 |
| JP | 2011 12 3127 | 12/2012 |

OTHER PUBLICATIONS

International Search Report for PCT/EP2013/052073, dated Apr. 16, 2013.

*Primary Examiner* — Sultan Chowdhury
*Assistant Examiner* — Danell L Owens
(74) *Attorney, Agent, or Firm* — Norton Rose Fulbright US LLP (57) ABSTRACT

A device for projecting an image includes: a video signal device designed to provide a video signal that has a first image refresh rate; a mirror control device designed to control a micro-mirror device with a second image refresh rate adapted to at least one characteristic of the micro-mirror device and to the first image refresh rate; and a projection device designed to project the video signal provided by the video signal device with the first image refresh rate, using the micro-mirror device moved by the second image refresh rate.

10 Claims, 5 Drawing Sheets

(56) References Cited

U.S. PATENT DOCUMENTS

| | | |
|---|---|---|
| 2002/0054031 A1 | 5/2002 | Elliott et al. |
| 2003/0112507 A1 | 6/2003 | Divelbiss et al. |
| 2004/0136686 A1 | 7/2004 | Kono et al. |
| 2005/0046909 A1 | 3/2005 | Kobayashi |
| 2007/0195408 A1 | 8/2007 | Divelbiss et al. |
| 2009/0316116 A1 | 12/2009 | Melville et al. |
| 2010/0033555 A1 | 2/2010 | Nagase et al. |
| 2011/0267361 A1 | 11/2011 | Kurozuka |

\* cited by examiner

DEVICE FOR PROJECTING AN IMAGE, PORTABLE MOBILE DEVICE COMPRISING A CORRESPONDING DEVICE, AND A METHOD FOR PROJECTING AN IMAGE

BACKGROUND OF THE INVENTION

1. Field of the Invention

The present invention relates to a device for projecting an image, to a portable mobile device having a corresponding device, and to a method for projecting an image.

2. Description of the Related Art

In published Japanese patent application JP 101 551 60 A, a process and a method are described for converting image refresh rates of a video projector. The device described there, which multiplies a digital video signal by an arbitrary whole-number value, is provided for the modification of the image refresh rate.

US Patent Application Publication No. 2003 112 507 A1 describes a system and a device for changing an image refresh rate of a video projector. Here, the modification of the image refresh rate takes place through an omission or change of individual image lines.

US Patent Application Publication No. 2007 195 408 A1 describes a projection device designed for three-dimensional projection, which synchronizes an image refresh rate of a projector with the image refresh rate of a video input signal using a data conversion unit.

US Patent Application Publication No. 2010 00 33 555 A1 describes a synchronization device for video projectors that converts an input video signal into a signal adapted to the projection through a rate doubling.

US Patent Application Publication No. 2004 013 66 86 A1 describes a method for suppressing the deterioration of the image quality of films played back on an image reproduction device having a deviating frame rate. A projector having DVD play function is configured to convert film data that have been read from a DVD having a frame rate of 24 fps to a frame rate of 72 fps.

BRIEF SUMMARY OF THE INVENTION

Accordingly, the present invention creates a device for projecting an image having a video signal device that is designed to provide a video signal having a first image refresh rate, having a mirror controlling device that is designed to control a micro-mirror device with a second image refresh rate adapted to at least one characteristic of the micro-mirror device and to the first image refresh rate, and having a projection device that is designed to project the video signal provided by the video signal device with the first image refresh rate, using the micro-mirror device moved by the second image refresh rate.

In addition, according to the present invention a method is provided for projecting an image. The method includes the following steps: provision of a video signal having a first image refresh rate by a video signal device, adaptation of a second image refresh rate used for the projection of the image to at least one characteristic of the micro-mirror device and to the first image refresh rate, controlling of a micro-mirror device with the adapted second image refresh rate, and projection of the video signal provided by the video signal device with the second image refresh rate.

An idea of the present invention is therefore to provide a synchronization of the first image refresh rate with which the received video signal is coded to the second image refresh rate by which the image information of the incoming video signal is projected. Through the design according to the present invention of the device and of the method for projecting the image, it is advantageously enabled, depending on the characteristics of the projection device, to carry out a projection with an adapted image refresh rate, the adapted image refresh rate being adapted as efficiently as possible to the mechanical properties and characteristics of the projection device. In this way, an operation of the projection device in a frequency range of the horizontal or vertical line or column frequency of the image formation that is unfavorable for the micro-mechanics is avoided.

According to an advantageous specific embodiment of the present invention, the device is designed to stop, for a delay time span, a line-by-line image formation as a function of the adapted second image refresh rate, before a projection of a first line of the image or after a projection of a last line of the image.

According to a further advantageous specific embodiment of the present invention, the device is designed to stop, for a delay time span, a line-by-line image formation as a function of the adapted second image refresh rate, during the projection of a line of the image.

According to a further advantageous specific embodiment of the present invention, the device is designed to omit individual lines of the image, during projection of the image, as a function of the adapted second image refresh rate.

According to a further advantageous specific embodiment of the present invention, the device is designed to carry out the adaptation of the second image refresh rate to the at least one characteristic of the micro-mirror device as a function of operating conditions of the device and/or of the micro-mirror device. This advantageously makes it possible, for changed operating conditions such as ambient temperature or air pressure or air humidity, to better adapt the second image refresh rate to the characteristics of the micro-mirror device.

According to a further advantageous specific embodiment of the present invention, the device has a storage means for buffering of the video signal. Advantageously, here only a fraction of the memory requirement of a frame of the image that is to be projected is required as the size of the storage means.

According to a further advantageous specific embodiment of the device, the first image refresh rate and the second image refresh rate are vertical image refresh rates of the image.

According to a further advantageous specific embodiment of the present invention, the video signal device has an interface device that is designed to receive the video signal from an external video source, the external video source having an image rate specification device that is designed to send to the external video source a specification for the first image refresh rate of the received video signal.

DETAILED DESCRIPTION OF THE INVENTION

Figure 1:
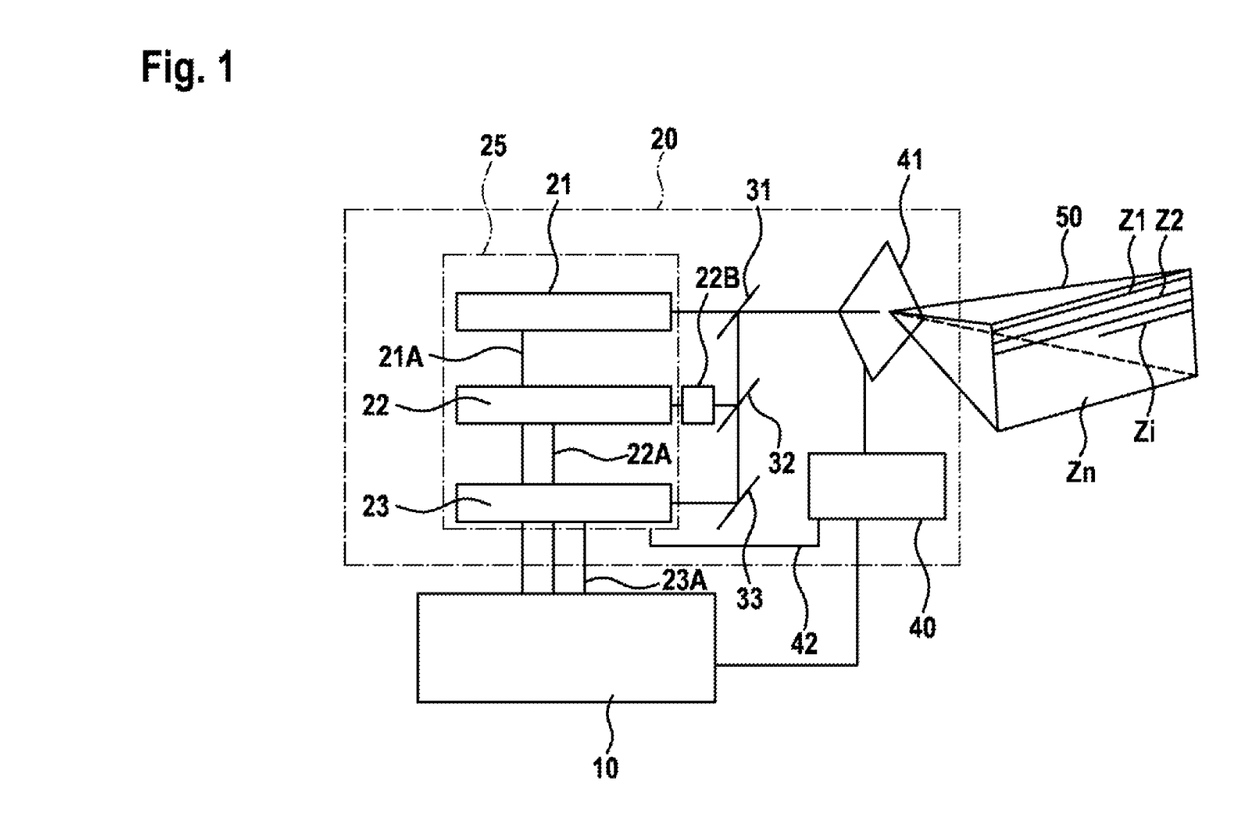
FIG. 1 shows a schematic representation of a device for projecting an image according to a first specific embodiment of the present invention.

FIG. 1 shows a schematic representation of a device for projecting an image according to a first specific embodiment of the present invention.

The device includes a video signal device 10, a mirror controlling device 40, and a projection device 20.

Video signal device 10 supplies a video signal that includes a serial configuration of electrical voltages through which image brightnesses and colors of image 50 to be projected are coded. The video signal is for example fashioned as an RGB signal through which individual signals for the colors red, green, and blue are respectively transmitted in supply lines 21A-23A. The RGB signals are for example transmitted via a VGA terminal, via a cinch plug, via an HDMI plug, via a DVI plug, directly via a circuit board, via a CIF plug, or via an SCART connector. Here, HDMI stands for "High Definition Multimedia Interface," DVI stands for "Digital Visual Interface," CIF stands for "Common Intermediate Format," and SCART stands for the French "Syndicat des Constructeurs d'Appareils Radiorécepteurs et Téléviseurs," or "Radio and Television Receiver Manufacturers' Association."

Mirror control device 40 and a laser device 25 are for example integrated into projection device 20. In addition, mirror controlling device 40 and laser device 25 are coupled for example via a control connection 42. Control connection 42 is used for the exchange of data and to synchronize mirror controlling device 40 and laser device 25.

Laser device 25 includes a first laser unit 21, a second laser unit 22, and a third laser unit 23. Laser device 25 controls laser units 21-23 with control signals. Supply lines 21A-23A further connect laser units 21-23 to video signal device 10.

First laser unit 10 is for example realized as a red-colored laser that produces laser radiation having a red spectral color.

Second laser unit 22 is realized for example as an infrared laser, or IR laser for short, that produces laser radiation in the infrared range. A frequency doubling device 22B is situated in the beam path of second laser unit 22. For example, frequency doubling device 22B permits a halving of the laser radiation emitted by second laser unit 22. For example, from the infrared radiation having the wavelength 1064 nm of a neodymium-doped yttrium-aluminum-garnet laser, or Nd:YAG laser for short, used as second laser unit 22, green light having wavelength 532 nm can be produced. Second laser unit 22 can also be a laser that directly emits green light, for example an indium-gallium-nitride laser.

A third laser unit 23 is for example realized as a blue-colored laser that produces laser radiation in a wavelength range perceived as having a blue color.

The laser beams of laser units 21-23 are conducted, via mirror devices 31, 32, 33 that are designed as fully reflecting mirrors or as half-transparent mirrors or as some other kind of deflecting mirrors, onto a micro-mirror device 41 that is designed to execute oscillatory movements on the basis of incoming movement and deflection signals.

Laser units 21-23 are for example realized as laser diodes or as semiconductor lasers or as some other kind of semiconductor components that produce laser radiation.

Mirror controlling device 40 is designed to produce the movement and deflection signals for micro-mirror device 41. For this purpose, mirror controlling device 40 is connected to laser device 25 via control connection 42. Here, the control signals sent to laser units 21-23 by projection device 25 can be synchronized with the movement and deflection signals of mirror control device 40.

Micro-mirror device 41 is for example fashioned as a micro-electromechanical system, or MEMS.

Micro-mirror device 41 has for example one or more microscopically small, tiltable micro-mirrors. For these tiltable micro-mirrors of micro-mirror device 41 there is a maximum deflection, for example +/−5° or +/−20° or +/−90° or +/−150° from the rest position, it being possible to use any angle between these for the projection.

For example, micro-mirror device 41 is realized as a mirror plate mounted by folded flexible springs, and has mechanical inherent frequencies and resonant frequencies in the range of which operation of micro-mirror device 41 is possible with low signal amplitudes of the control signals. For example, here at least one axle of micro-mirror device 41 is controlled in resident fashion, for example the axle for movement in the horizontal, but the other axle of micro-mirror device 41 can also be driven in non-resident fashion.

When micro-mirror device 41 is forced from the outside to oscillations in the range of the mechanical inherent frequencies or resonant frequencies, micro-mirror device 41 reacts with particularly large amplitudes. In this way, an efficient and energy-saving operation of micro-mirror device 41 is enabled, because small signal amplitudes of the control signals already permit sufficiently large movement amplitudes of the mirror plate of micro-mirror device 41.

An adaptation of the second image refresh rate to the mechanical inherent frequencies or resonant frequencies of micro-mirror device 41 as a characteristic of micro-mirror device 41 is therefore advantageous. The adaptation can for example take place by a computing unit situated in mirror control device 40 or in projection device 20 or in laser device 25. The computing unit is for example designed as a microprocessor or as a memory-programmable control unit.

For example, these ranges of the mechanical inherent frequencies or resonant frequencies of micro-mirror device 41 are acquired through an automated analysis of the deflections of micro-mirror device 41 as a function of an applied signal amplitude of the control signals over a specified frequency range by the computing unit.

Thus, for the operation of micro-mirror device 41, optimally suitable frequency ranges having associated second image refresh rates can be determined by the computing unit and used for further operation. Here, the optimally suitable frequency ranges for the second image refresh rate can be regularly newly acquired by the computing unit, for example after specified time intervals have elapsed.

An image 50 to be projected by the device is made up of individual lines Z1-Zn. These lines Z1-Zn are transmitted one after the other and displayed one under the other. Due to the sluggishness of the eye, this process is not visible, or is barely visible. At the upper left, shown in black, the image formation starts with line Z1. When the right edge of the image has been reached, there is a line return. The light beam of laser units 21-23 is for example switched dark for the time of the return. The display of the next, second line Z2 starts at the left edge.

An individual line Zi of image 50 is here continuously built up by projection from left to right or from right to left. Each image 50 thus includes a plurality of lines Zi sent in succession.

Figure 2:
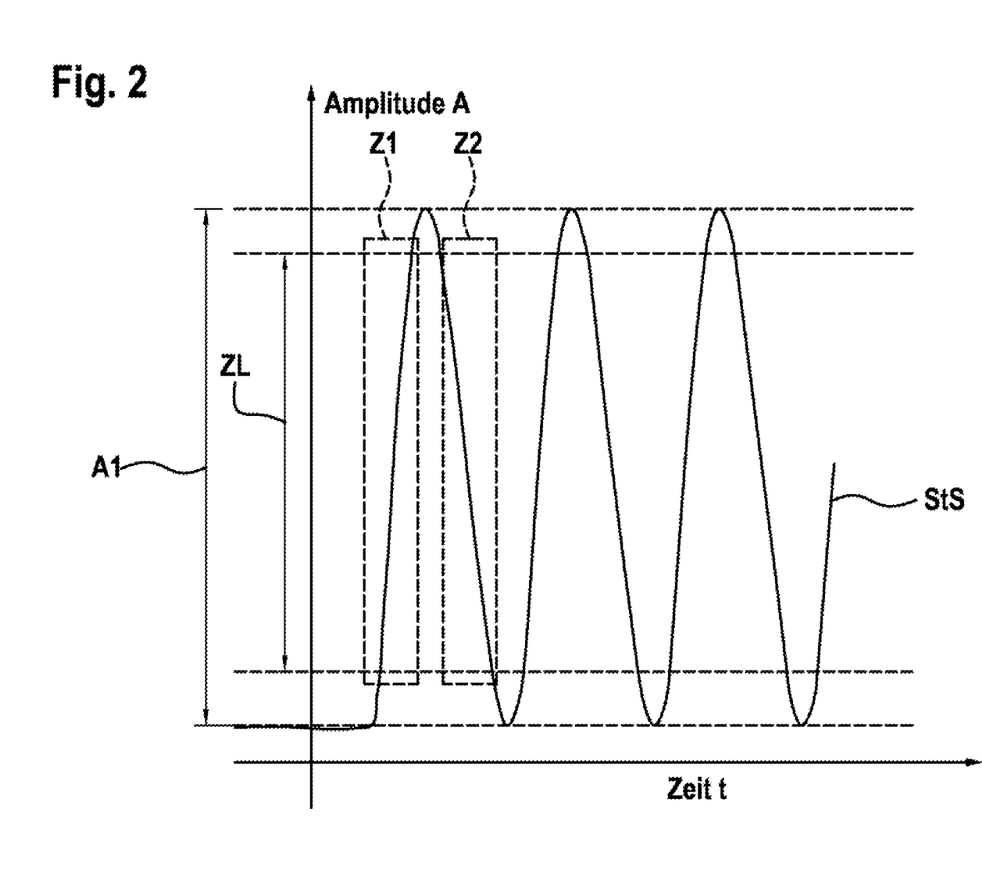
FIG. 2 shows a schematic representation of a time diagram of a control signal.

FIG. 2 shows a schematic representation of a time diagram of a control signal StS.

The image shows the temporal sequence of a plurality of lines Zi of the video signal. On the abscissa, time t is plotted, and on the ordinate amplitude A of a control signal StS is plotted. An amplitude value A1 of control signal StS defines a line length ZL of control signal StS that is usable for the projection of image 50.

In the signal curve of control signal StS shown in FIG. 2, two lines Z1 and Z2 are marked with a dashed surrounding box. In the depicted exemplary embodiment, here the back and forth motion of micro-mirror device 41 is used for the projection of lines Zi of image 50.

Figure 3:
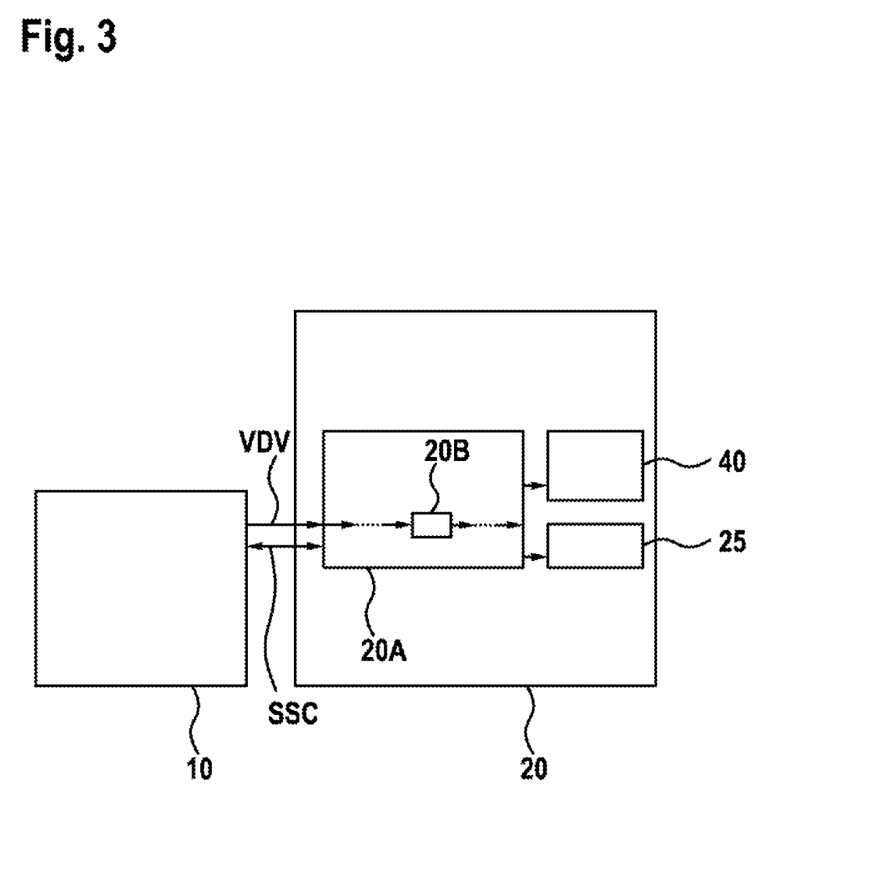
FIG. 3 shows a schematic representation of a device for projecting an image according to a second specific embodiment of the present invention.

FIG. 3 shows a schematic representation of a device for projecting an image according to a second specific embodiment of the present invention.

A device includes for example projection device 20 and video signal device 10. Projection device 20 is for example realized as a portable mobile device or as a portable mobile telephone.

Video signal device 10 is connected to projection device 20 for example via a video data connection VDV and via a control interface SSC. Video data connection VDV is for example designed for the transmission of data, and control interface SSC permits a data communication between video signal device 10 and projection device 20.

Projection device 20 is for example realized having an image data processing unit 20A and a synchronization unit 20B. Synchronization unit 20B is here designed to buffer image information or individual images of the video signal sent by video signal device 10 to projection device 20 via video data connection VDV, or to adapt the first image refresh rate and the second image refresh rate to one another.

In addition, the second image refresh rate used for the projection of the video signal can be adapted to resonant frequencies of micro-mirror device 41. The resonant frequencies of micro-mirror device 41 are specified by the masses of the micro-mirrors that are to be moved of micro-mirror device 41, and by the rigidity of the suspensions of the micro-mirrors that are to be moved of micro-mirror device 41.

Advantageously, micro-mirror device 41 is operated in the range of its mechanical resonant frequency, because deflections in this frequency range can be achieved already with low signal strengths and thus with a low energy requirement.

The further reference characters shown in FIG. 3 have already been explained in the description associated with FIG. 1, and are therefore not further described.

Figure 4:
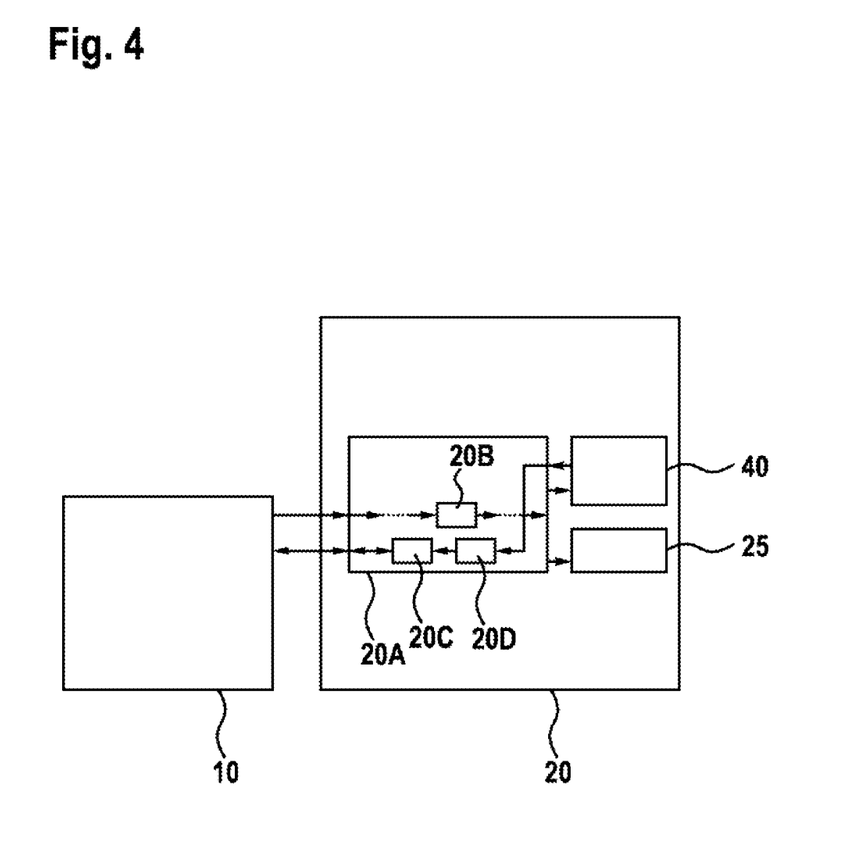
FIG. 4 shows a schematic representation of a device for projecting an image according to a third specific embodiment of the present invention.

FIG. 4 shows a schematic representation of a device for projecting an image according to a third specific embodiment of the present invention.

Projection device 20 shown in FIG. 4 has, in addition to image data processing unit 20A and synchronization unit 20B, an interface device 20C controlled by a control device 20D. Interface device 20C is designed for data and control communication with video signal device 10.

Control device 20D can for example acquire target and actual positions of micro-mirror device 41, and can specify image refresh rates adapted thereto for the video signal sent by video signal device 10. These specifications are then sent to video signal device 10 via interface device 20C.

The further reference characters shown in FIG. 4 have already been explained in the description associated with FIG. 1, and are therefore not further described.

Figure 5:
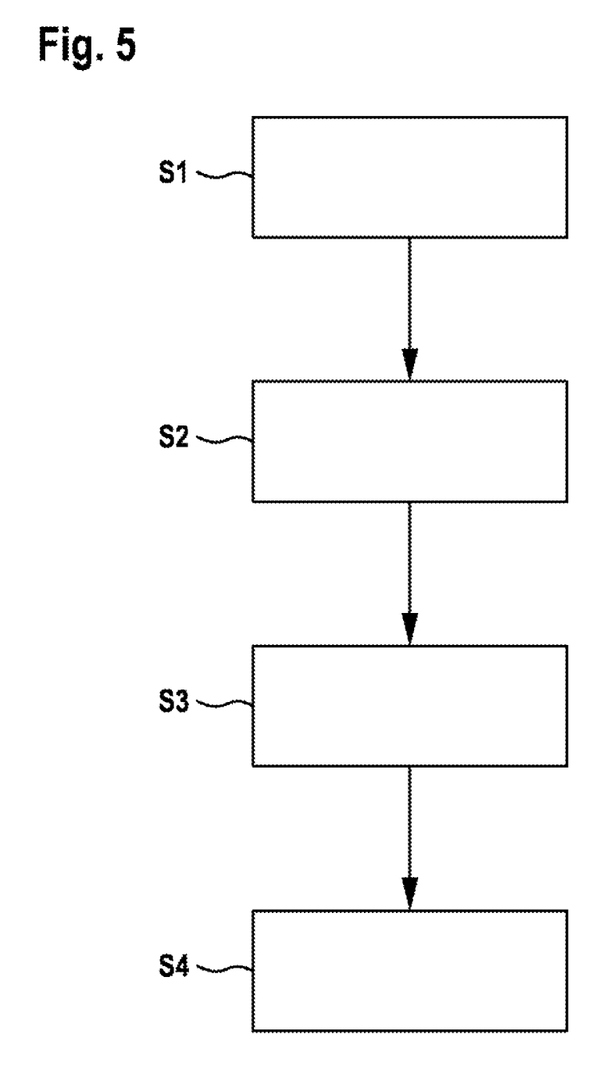
FIG. 5 shows a schematic representation of a flow diagram of a method for projecting an image according to a fourth specific embodiment of the present invention.

FIG. 5 shows a schematic representation of a flow diagram of a method for projecting an image according to a fourth specific embodiment of the present invention.

In a first method step, a provision S1 takes place, by video signal device 10, of a video signal having a first image refresh rate.

In a second method step, an adaptation S2 is carried out of a second image refresh rate used for the projection of the image to at least one characteristic of micro-mirror device 41 and to the first image refresh rate.

Adaptation S2 can here take place in such a way that the second image refresh rate has whole-number multiples of the first image refresh rate, or that the second image refresh rate is situated in a resonance range of the mechanical construction of micro-mirror device 41.

In a third method step, there takes place a controlling S3 of a micro-mirror device 41 with the adapted second image refresh rate.

In a fourth method step, there takes place a projection S4 of the video signal provided by video signal device 10 through a line-by-line image formation as image 50 with the second image refresh rate.

Method steps S1-S4 of the method can here take place iteratively for the line-by-line image formation of image 50. In addition, the method for reducing image flickering during projection of image 50 can for example also use an interlaced scanning method.

What is claimed is:

1. A projection device for projecting an image, comprising:
   a video signal device providing a video signal having a first image refresh rate;
   a mirror control device controlling a micro-mirror device with a second image refresh rate that is adapted to synchronize the first image refresh rate and the second refresh rate based on the following: i) at least one characteristic of the micro-mirror device and ii) the first image refresh rate; and
   a laser device operated with the second image refresh rate and projecting the video signal provided by the video signal device with the first image refresh rate, using the micro-mirror device moved by the second image refresh rate.

2. The projection device as recited in claim 1, wherein the projection device is configured to stop, for a predefine delay time span, one of before a projection of a first line of the image or after a projection of a last line of the image, a line-by-line image formation, as a function of the adapted second image refresh rate.

3. The projection device as recited in claim 1, wherein the projection device is configured to stop, for a predefined delay time span during the projection of a line of the image, a line-by-line image formation, as a function of the adapted second image refresh rate.

4. The projection device as recited in claim 3, wherein the projection device is configured to omit selected individual lines of the image during the projection of the image as a function of the adapted second image refresh rate.

5. The projection device as recited in claim 3, wherein the projection device is configured to adapt the second image refresh rate to the at least one characteristic of the micro-mirror device as a function of an operating condition of at least one of the projection device and the micro-mirror device.

6. The projection device as recited in claim 5, further comprising:
   a data storage unit for buffering the video signal.

7. The projection device as recited in claim 3, wherein the first image refresh rate and the second image refresh rate are vertical image refresh rates of the image.

8. The projection device as recited in claim 3, wherein the video signal device has an interface unit receiving the video signal from an external video source which has an image rate specification device sending a specification for the first image refresh rate of the received video signal to the external video source.

9. The projection device as recited in claim 3, wherein the projection device is part of a portable mobile device.

10. A method for projecting an image, comprising:
   providing, by a video signal device, a video signal having a first image refresh rate;
   adapting a second image refresh rate used to project the image, wherein the second image refresh rate is adapted to synchronize the first image refresh rate and the second refresh rate based on the following: i) at least one characteristic of a micro-mirror device and ii) the first image refresh rate;
   controlling the micro-mirror device with the adapted second image refresh rate; and
   projecting the video signal provided by the video signal device as an image with the second image refresh rate.

* * * * *